United States Patent
Pigos, Jr. et al.

(10) Patent No.: US 6,370,521 B1
(45) Date of Patent: Apr. 9, 2002

(54) TRACKING SYSTEM, METHOD AND COMPUTER PROGRAM PRODUCT FOR DOCUMENT PROCESSING

(75) Inventors: Charles R. Pigos, Jr.; Pamela S. Austin, both of Morrisville; Vernon P. Bennett, Durham; Linda S. Williams, Raleigh, all of NC (US)

(73) Assignee: Bell & Howell Mail Messaging Technologies Company, Durham, NC (US)

( * ) Notice: Subject to any disclaimer, the term of this patent is extended or adjusted under 35 U.S.C. 154(b) by 0 days.

(21) Appl. No.: 09/181,497

(22) Filed: Oct. 28, 1998

Related U.S. Application Data
(60) Provisional application No. 60/097,969, filed on Aug. 26, 1998, and provisional application No. 60/097,860, filed on Aug. 25, 1998.

(51) Int. Cl.[7] .............................................. G06F 17/30
(52) U.S. Cl. ........................... 707/2; 707/10; 709/101; 709/203
(58) Field of Search ................ 707/3, 5, 1, 2, 707/10, 500; 705/410; 709/101, 201, 203, 217

(56) References Cited

U.S. PATENT DOCUMENTS

| | | | | |
|---|---|---|---|---|
| 5,060,165 A | * | 10/1991 | Schumacher et al. | 700/213 |
| 5,408,334 A | * | 4/1995 | Yamagishi et al. | 358/402 |
| 5,546,577 A | * | 8/1996 | Marlin et al. | 707/103 |
| 5,557,736 A | * | 9/1996 | Hirosawa et al. | 714/4 |
| 5,612,889 A | * | 3/1997 | Pintsov et al. | 700/226 |
| 5,758,074 A | * | 5/1998 | Marlin et al. | 709/250 |
| 5,873,073 A | * | 2/1999 | Bresnan et al. | 705/410 |
| 5,937,162 A | * | 8/1999 | Funk et al. | 709/206 |
| 6,049,775 A | * | 4/2000 | Gertner et al. | 705/8 |
| 6,119,051 A | | 9/2000 | Anderson, Jr. et al. | 700/221 |
| 6,266,575 B1 | | 7/2001 | Anderson, Jr. et al. | 700/221 |

\* cited by examiner

*Primary Examiner*—Jack M. Choules
*Assistant Examiner*—Cheryl Lewis
(74) *Attorney, Agent, or Firm*—Jenkins & Wilson, P.A.

(57) ABSTRACT

An integrated computer system architecture for tracking of job data in a document processing environment including an infrastructure built on processes, hardware, software and interfaces designed to monitor and control mail processing and data collection through a variety of manual and machine processes in real-time. Computers, networks, web-based applications, databases and scanners are used to interface and integrate traditional mail processing equipment with customized software. The invention integrates the entire mail production process to form and establish a complete end-to-end system. A job tracking scheme is detailed illustrating a particular data mining application.

51 Claims, 13 Drawing Sheets

FIG. 7

| TIME | BATCH | OPERATOR | MACHINE | STAGE |
|---|---|---|---|---|
| 808 | 810 | 812 | 814 | 816 |

OPERATOR NAME

ALL

ALL
CRIMMINS, STEVE
MELNICK, STEPHEN
POWELL, TRAVIS
RUIZ, MARCO
WANG, TONY

| 808 | 810 | 812 | 814 | 816 |
|---|---|---|---|---|
| TIME | BATCH | OPERATOR | MACHINE | STAGE |

ALL

ALL
BH-3000-1
BH-3000-2
BH-3000-3
BH-3000-4
BH-3000-5
BH-3000-6
BH-3000-7

──── MACHINE NAME ────

| GROUP | STATEMENT I.D. | STATEMENT TYPE | BATCH NUMBER | NUMBER OF ENVELOPES | NUMBER OF PAGES |
|---|---|---|---|---|---|
| CWRR | 406BVBS | M2 | 002 | 22 | 44 |
| CWRR | DLY0302 | M2 | 005 | 22 | 44 |
| INDV | 102AFLA | M1 | 001 | 22 | 44 |
| INDV | 102AFLA | M1 | 002 | 0 | 2134 |
| INDV | 102AFLA | M1 | 003 | 22 | 44 |
| INDV | 102AFLA | M1 | 007 | 22 | 44 |
| INDV | 102AFLA | M1 | 44 | 216 | 432 |

———— BATCHES ———— 820

———— SUMMARY ———— 824

| | |
|---|---|
| NUMBER OF BATCHES | 35 |
| NUMBER OF ENVELOPES | 898 |
| NUMBER OF PAGES | 819 |

| TIME STAMP | TRANSACTION TYPE | MANAGING DEVICE | DEVICE | OPERATOR |
|---|---|---|---|---|
| 1998-07-29 15:12:00.0 | START INSERT | INT-2425-3 | BH-3000-1 | TYW |
| 1998-07-29 15:12:10.0 | FINISH INSERT | INT-2425-3 | BH-3000-1 | TYW |
| 1998-07-30 08:04:00.0 | START INSERT | INT-2425-3 | BH-6000-1 | SMM |
| 1998-07-30 08:04:14.0 | FINISH INSERT | INT-2425-3 | BH-6000-1 | SMM |
| 1998-07-30 09:05:49.0 | START INSERT | INT-2425-3 | BH-6000-2 | TOP |
| 1998-07-30 09:12:53.0 | FINISH INSERT | INT-2425-3 | BH-6000-2 | TOP |
| 1998-07-30 09:15:25.0 | FINISH INSERT | INT-2425-3 | BH-6000-2 | TOP |
| 1998-07-30 09:17:56.0 | FINISH INSERT | INT-2425-3 | BH-6000-2 | TOP |
| 1998-07-30 11:04:49.0 | START INSERT | INT-2425-3 | BH-6000-3 | SMM |
| 1998-07-30 11:05:55.0 | FINISH INSERT | INT-2425-3 | BH-6000-3 | SMM |
| 1998-08-12 11:57:14.0 | START INSERT | INT-2425-3 | BH-6000-1 | SMC |

GROUP: INDV
STATEMENT I.D: 102AFLA
STATEMENT TYPE: M1

BATCH I.D: INDV102AFLAM144
BATCH NUMBER: 44
TOTAL ENVELOPES: 216
TOTAL PAGES: 432

846 — START INSERT
848 — FINISH INSERT
850 — RETURN TO BATCH QUERY

TRACKING SYSTEM, METHOD AND COMPUTER PROGRAM PRODUCT FOR DOCUMENT PROCESSING

This Appln claims benefit of Prov. No. 60/097,860 filed Aug. 25, 1998 and No. 60/097,969 filed Aug. 26, 1998.

FIELD OF THE INVENTION

The present invention relates generally to tracking systems for tracking job data generated in document processing. More specifically, the present invention relates to a tracking system for tracking job data in automated mail document processing.

BACKGROUND OF THE INVENTION

The automation of document processing, particularly mail processing, is ever-evolving. As mail processing migrates to an Automated Messaging Factory (AMF) model, the need to "track" jobs and production in real-time becomes critical. Implementing job tracking in a mail processing environment is a complex integration of many different systems and functions. The current mail processing environment is one of constant change. New technologies, market changes, customer preferences, manufacturing tools and techniques are driving these changes. By way of background, the current mail processing environment typically can be viewed from three perspectives, the physical view, the process view, and the information (data) view.

The physical view of the mail processing environment comprises, inter alia, printing, inserting, metering, and sorting equipment or devices. In most cases, this equipment is standalone and is not connected to production control or supervisory systems. In many current mail processing operations, it is not uncommon to find mail processing devices that are ten to fifteen years old. Unfortunately older devices generally are not equipped with robust control systems or communication capabilities. Integrating these older mail processing devices is, therefore, somewhat of a challenge. Another characteristic found in the existing mail processing environment is that production information is typically recorded and tracked manually via operator and device log sheets. This is due to the standalone nature of the aforementioned production equipment.

The process view of the mail processing environment covers all of the major components that comprise the physical view (e.g., printing, inserting, metering, sorting, etc.). A key aspect of the process view is that it operates as an "open-loop" system. By open-loop, it is meant that verification and reconciliation of data among process steps (or functional areas) is not done. Verification and reconciliation features are important in the mail processing environment because they provide fundamental feedback regarding production, status, and results of mail processing jobs. A mail processing system having verification and reconciliation of data is considered a closed-loop control system. Jobs currently progress to and from each separate functional area manually only after the job is deemed complete. A job is deemed complete upon observations of supervisory personnel. In addition, separate processes (or functional areas) typically are not linked together according to job names or work flow techniques. Jobs are labeled with identifiers that map one functional name to another as the job proceeds through the mail processing environment. For example, jobs originating in the print area that are earmarked for the inserting area get renamed from print area "System ID" job names to inserting area job names that are related to company products such as "Checking" or "Market Rate Account" for instance.

The information view is probably the most important perspective in terms of job tracking. This is because job tracking is based on collecting and using production data to better manage and verify production. The information, or data, used currently in mail production processes possess three fundamental traits:

Data is manually collected thereby involving accuracy and timeliness issues;

Data is machine specific so operators are required to record data for their machine; and Roll-up production reports must be developed manually through spreadsheets.

The current mail processing environment provides very limited forward planning capabilities because it is reaction driven meaning there are limited opportunities to define measurements and define improvements.

In general, what is needed is a pro-active mail processing environment focusing on establishing three key factors:

Providing connectivity across all functional areas with the production process for the purpose of integrating separate functional areas within an end-to-end system;

Automating processes and data collection activities; and

Using the production data for reconciliation and workflow management.

Implementation of these three key factors will establish a closed-loop information and control system that enables improved efficiencies and reduced costs.

DISCLOSURE OF THE INVENTION

The system of the present invention is based on an integrated architecture that includes an infrastructure built on processes, hardware, software and interfaces. The system is designed to monitor and control mail processing and data collection through a variety of manual and machine processes in real-time. The present invention uses computers, networks, web-based applications, databases and scanners to interface and integrate traditional mail processing equipment with customized software and a database repository. The present invention integrates the entire mail production process, as known by those of skill in the art of mail processing, to form and establish a complete system. Typical system components may include mainframe print manipulation software, such as Bell & Howell's Transformer™, Unix, and/or Microsoft NT file servers, and database management software and reporting software. Certain system operators would have system access from personal computers or other processing devices that are connected to or resident in mail processing devices. Management and other key personnel would have system access via a company wide Intranet driven by a browser on their personal computers. Direct access through a Local Area Network (LAN) connection is also an option available to system users. Network connections typically use, for example, Ethernet 10baseT running TCP/IP. These components would also be interfaced with corporate document management processes, software and equipment.

The present invention focuses on a job tracking data application. A job tracking application gathers data from each work station or mail processing device as materials pass through a defined route. Mail processing devices include, but are not limited to, inserters, sorters, postage meters, printers, rollers, and any other suitable devices for document processing. Using strategically placed barcodes, data or a job (batch of material) is scanned as it enters and leaves the work area of a mail processing device thereby providing an audit trail. Data consolidation, another feature of the system, refers to collecting data from multiple mail processing devices, Data consolidation devices typically use high-end server computers using an Ethernet connection and a standard network protocol such as TCP/IP. Other connections and protocols are readily implementable, however.

Other hardware compatible for system use includes portable barcode labelers for tray tagging, and network printers for printing reports. Robust personal computers with data back-up units (e.g., zip drive) and auxiliary power supplies are recommended for network file servers. End-user personal computers need not be as robust as the network servers.

Open client/server system architecture and software is utilized as much as possible. Custom solutions are developable to integrate functions or provide functionality where none currently exists. For example, an interface between a data consolidation printer application and a job tracking application may require a custom fit.

The key to a successful system architecture is to identify processes and functions and build modular interfaces capable of collecting data and device information in real-time. Moving into an automated environment requires intelligence at the device level (regardless of the device type) in order to be able to communicate with a data collection device. Barcode readers and scanners (handheld or wand) are utilized in data collection. Whether mounted on equipment or hand-held, these devices enable data collection and processing to occur. Bell & Howell's Videotracker and Integrity Control System are examples of barcode readers for mail inserter devices.

Migrating to an Automated Messaging Factory environment requires the ability to actively manage and understand key production information in a real-time fashion across the entire mail production process. The ability to adjust and manage workflow issues before they impede schedule and cost targets is the added value of such an infrastructure. The present invention is focused on providing a job tracking system with a closed "feed-back" loop. A "closed loop" control system will achieve greater efficiencies and better performance, as opposed to an "open-loop" system because there is constant data verification. The present invention applies closed loop control theory to mail processing providing feedback and control features as a basis for the system architecture by using print stream data. Such a feedback loop provides operations management and supervisors with the ability to measure attributes known to those of skill in the art of mail processing, such as percent to complete for shift, job, etc., active status of work-in-progress (WIP) number of complete jobs or pieces, and essentially provide a full reconciliation of planned versus actual production.

With increased volumes and customer demands, the ability to track jobs through the print and finishing stages of mail processing is quite valuable and advantageous as is readily apparent to those of skill in the art. A factory control or job tracking system can automate the tedious function of data collection as work passes through each step on the mail processing route. These types of systems are connected real-time to other mail processing equipment across functional areas. For instance, Bell & Howell's Transformer™ mainframe print manipulation tool can read data from a print header page and format a barcode for printing. By printing a barcode on the first and last pages of output, jobs can be tracked through mail processing stages. The jobs are scanned entering and leaving different mail processing areas to provide an audit trail in both mechanized and manual areas. Data is timely and accurate and can be used to monitor operator efficiency, quickly validate service level agreements, and generate monthly statistics. Large productivity gains can be realized by eliminating time-consuming manual data collection and report generation. Job tracking will collect data from mail processing devices as jobs are being processed and provide user access to the information through customized data applications which access the central server/database to mine data.

It is therefore an object of the present invention to provide a novel job tracking system for tracking data in automated document processing with particular application to the mail proceesing environment.

It is another object of the present invention to provide a common data collection facility for all functions within the mail processing environment.

It is a further object of the present invention to automate data collection for desired functional areas within the mail processing environment.

It is a still further object of the present invention to real-time status of current work in process and completed work across desired mail processing functional areas.

Some of the objects of the invention having been stated, other objects will become evident as the description proceeds, when taken in connection with the accompanying drawings described below.

BRIEF DESCRIPTION OF THE DRAWINGS

The foregoing advantages and features of the present invention will be appreciated more fully from the following description with reference to the accompanying drawings in which:

FIG. 7 illustrates the time tab panel within the job tracking applet;

FIG. 9 illustrates the operator panel within the job tracking applet;

FIG. 10 illustrates the machine panel within the job tracking applet;

FIG. 12 illustrates the batches panel that has been filled with the results of a query; and FIG. 13 illustrates transactions for a particular batch.

BEST MODE FOR CARRYING OUT THE INVENTION

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
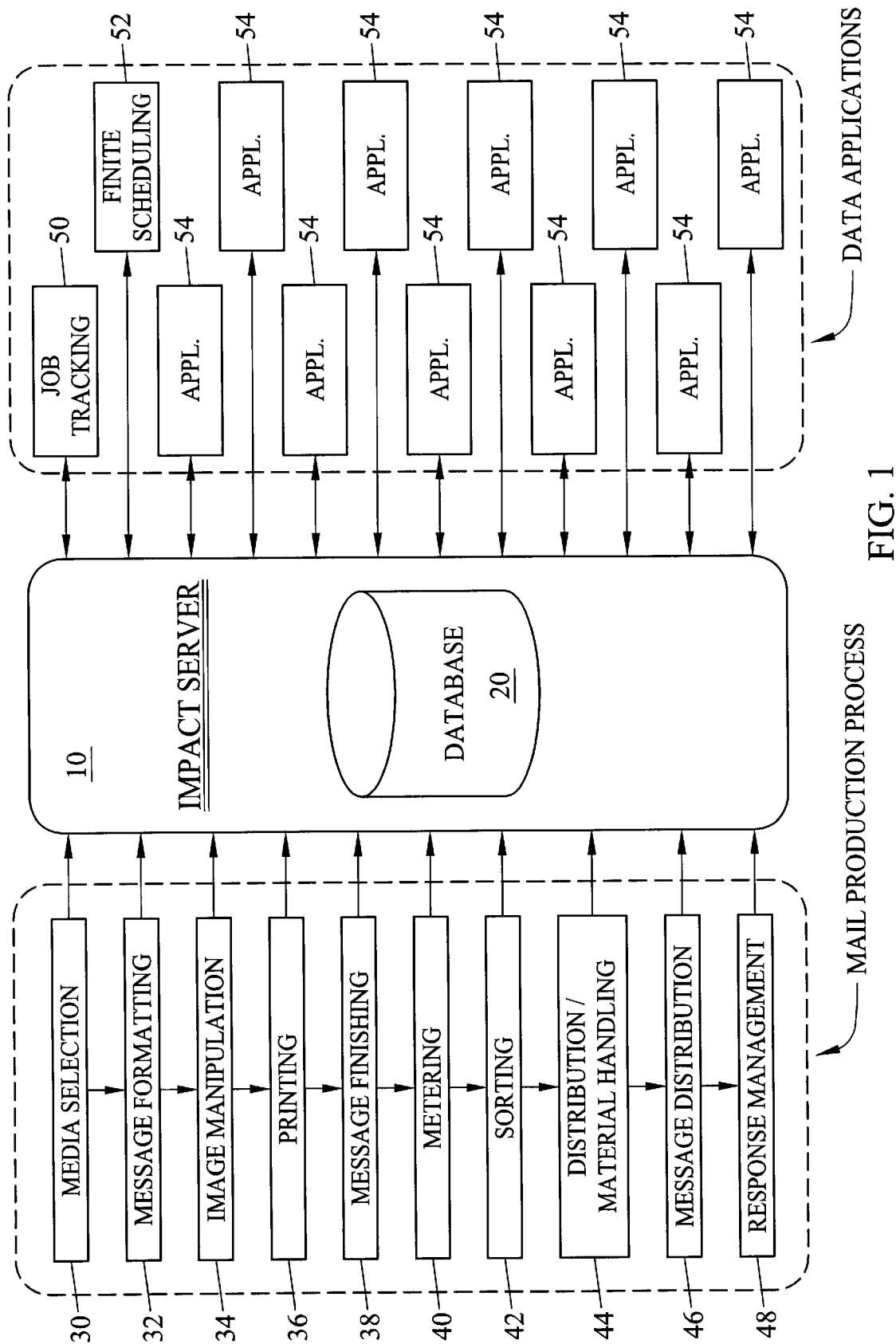
FIG. 1 illustrates a functional block diagram showing the general flow of data for the present invention from mail processing device to data application.

Referring now to FIG. 1 and in accordance with the present invention, the centerpiece of the present invention is a computer server 10 and database 20 labeled IMPACT™ which stands for Integrated Message Processing And Communications Technology (hereinafter"server"). Use of the term server throughout this application also encompasses the database within the server. As is readily appreciated by those of skill in the art of mail processing, the server is where the information resides for data applications that will mine production data. The server also acts as the mechanism for tying all of the functional areas together in the existing mail production process. Data mining refers to software applications designed to selectively retrieve and organize data from the database into a desired format. The software applications can be standard off the shelf software programs or customized data applications developed for specific purposes.

The items identified on the left side of FIG. 1 represent an example of a mail production process from beginning to end. Other functions or processes may, however, exist and would be readily implementable within the scope of the present invention. In this example, ten (10) functions or processes (reference numbers 38–48) have been shown, however, not all ten functions or processes need be utilized in every mail processing environment. Certain mail processing environments may only require a subset of the processes or functions shown. Each process or function (30–48) may be a combination of physical mail processing devices and/or process steps. Each function or process is now briefly discussed.

The Media Selection 30 process selects the type of media for communication to the end customer. Some examples include paper document, compact disk, data file, and facsimile. The Message Formatting 32 function is used to format data for the particular media chosen in the media selection process discussed above. The Image Manipulation 34 process provides the ability to include or manipulate the formatted data with additional control codes in order to make the data more presentable. The Printing 36 function is where a document is created in paper form. Typically, the devices involved in this function are high volume, high speed printers. The Message Finishing 38 process is where final assembly of a message or document occurs. Automated and manual inserters are involved in this process. The Metering 40 function weighs completed mailpieces and applies the correct postage thereto for distribution. The Sorting 42 process, separates completed mailpieces into a pre-defined order. The pre-defined order usually relates to a postal regional group or zip-code order. The Distribution/Material Handling 44 function sends final documents to the customer. The Message Distribution 46 function routes messages to the end customer. The Response Management 48 function handles correspondence to and from the end customer such as returned material (e.g., payment or information requests).

The items identified on the right side of FIG. 1 represent software applications that can be developed for the mail processing environment for data mining purposes. Job tracking 50 and finite scheduling 52 are identified as data applications.

There are three fundamental concepts to be gleaned from the model of FIG. 1.

The data collection layer (IMPACT™ server) is critical to establish connectivity and access to production data;

Mail processing steps are "linked" together to form an end-to-end system; and

Added value in the ability for growth and use of the data for job tracking.

It is to be understood that present invention illustrated herein is readily implementable by those of ordinary skill in the art as a computer program product having a medium with a computer program embodied thereon. The computer program product is capable of being loaded and executed on the appropriate computer processing device(s) in order to carry out the method or process steps described.

Figure 2:
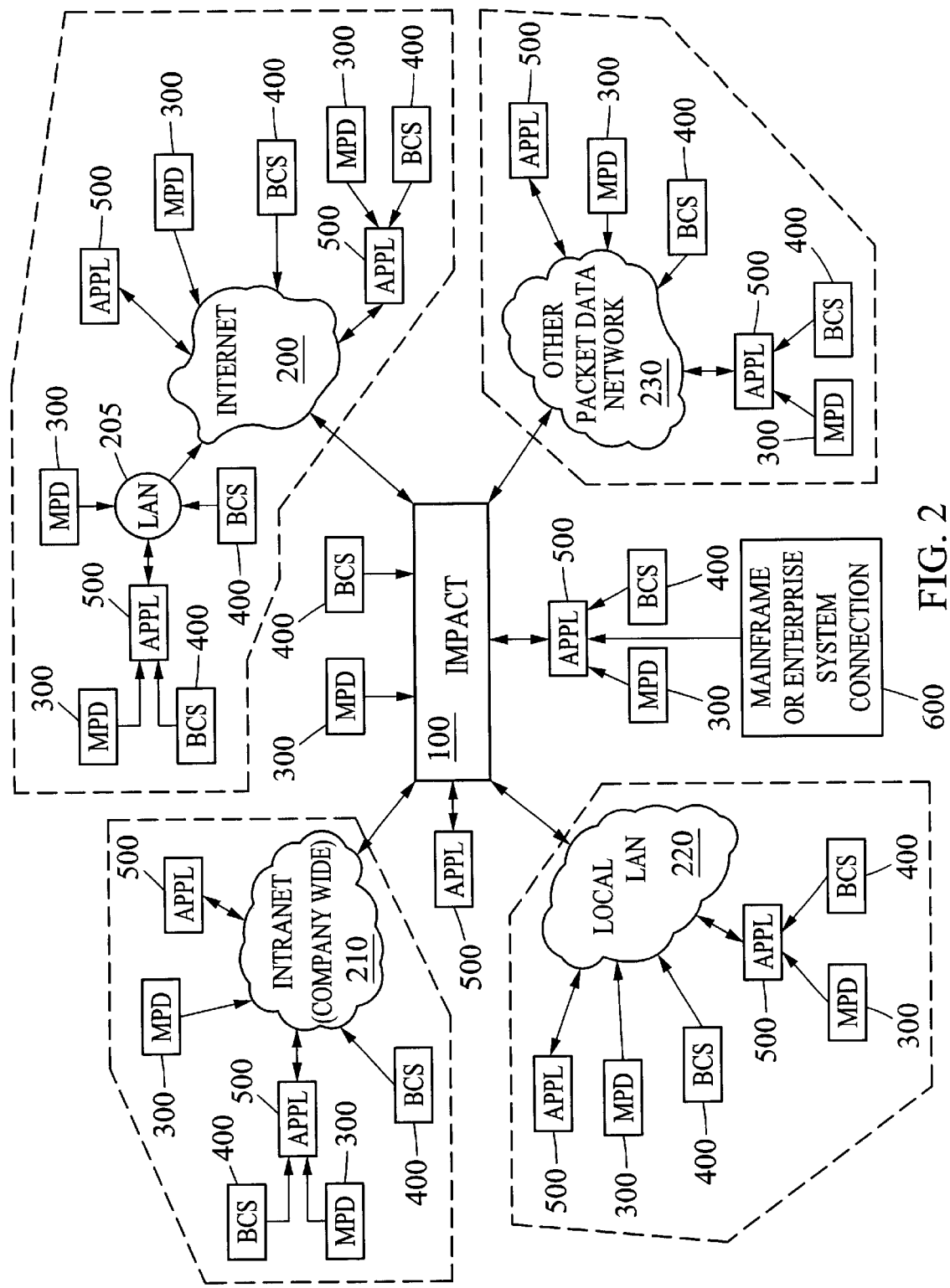
FIG. 2 illustrates a communications environment linking the functional components of the present invention.

Referring now to FIG. 2, the present invention can be implemented in a variety of communications environments. These include Local and Wide Area Network (LAN/WAN) environments, a company-wide Intranet, the Internet, and a dial-up connection among others. The present invention can be implemented, inter alia, in communications environments utilizing a TCP/IP communications protocol and environments utilizing SNA protocol. Hardware for implementing the present invention is consistent with typical personal computing equipment, and does not generally require specific environmental conditions. FIG. 2 illustrates some examples of system connectivity that permit system-wide access to the server. The IMPACT™ server 100 is the centerpiece of the present system. Server 100 is a fairly high end processing/communications/storage device having a database resident therein and multiple communications ports capable of communicating over a variety of medium using a variety of standard or even customized protocols. A feature of the system is the ability to access server 100 in just about any conceivable manner. Server access is required for two main purposes. First, data entry devices such as mail processing devices (MPDs) 300 themselves, or bar code scanners (BCSs) 400 must be able to relay data they generate to server 100 in order to populate the database resident therein. Second, software applications (APPLs) 500 must be able to access that database via server 100 for data mining purposes.

For instance, server 100 can be linked to the Internet 200 thereby providing access to server 100 from any device capable of connecting to the Internet 200. A local area network (LAN) 205 could have access to the Internet 200. Further, mail processing devices 300, bar code scanners 400 (or other data entry devices), and software applications 500 can be connected to LAN 205 and gain access to server 100 via the Internet 200. Moreover, mail processing devices 300 and data entry devices 400 can connect to the Internet 200 directly or through a software application 500. In the above described connectivity schemes, a company-wide Intranet 210 or other packet data network 230 may be substituted for the Internet. Or, the company-wide Intranet 210 may be added to the Internet 200 schemes providing even greater flexibility in accessing server 100. Similarly, a local area network (LAN) 220 can be directly connected to server 100. Mail processing devices 300, data entry devices 400, and software applications 500 can then access the server through local area network 220. It is also possible to have mail processing devices 300, data entry devices 400, and software applications 500 connected directly to server 100. Lastly, a mainframe, or enterprise system, connection 600 can be linked to a software application and ultimately to server 100.

The foregoing connectivity schemes are illustrative only. One of ordinary skill in the art could readily devise and implement alternate network connections to server 100 without departing from the spirit or scope of the present invention.

A job tracking system needs to be able to allow a user to track a mailpiece through each stage of the physical plant and optimize or schedule work based on a multitude of variables, In order to meet these criteria, the job tracking system of the present invention understandably requires data regarding jobs, operators, mail processing devices, and/or other suitable data parameters typically and conventionally involved in mail processing.

A list of job tracking capabilities/requirements is presented hereinbelow. The list is not intended to be limiting as more suitable capabilities can be added to the job tracking software application on an as needed basis in accordance with the present invention. For purposes of the present disclosure, however, the following twelve (12) areas have been identified for job tracking, as described hereinbelow.

The job tracking system of the present invention will track jobs and mailpiece counts for actual daily volumes. The job tracking system will track the actual daily volumes in an roll-up fashion and provide breakouts for machine volume totals as well as manual totals. The job tracking system will capture statistical and actual data for individual operators and mail processing devices. The job tracking system will account for general diverts and other types of diverts. For example, the number of errors, holds, or overweight pieces. The job tracking system will be able to perform a job breakdown per application per cycle. The job tracking system will track and provide an indication when a special insert required additional postage for a mailpiece. The job tracking system will perform account level tracking. The job tracking system will be able to perform piece level verification for integrity purposes. The job tracking system will track production statistics for all inserter devices connected to the network. The job tracking system will correlate print area job names and statement processing area job names into a common job naming scheme. The job tracking system will have query capability with access to job and account level data. The job tracking system will automate the statement rendering process (custom specific) in order to eliminate manual tracking errors. Thus, the job tracking system of the present invention is capable of organizing and providing job status for an entire job or for subsets of interest within the entire job depending on the nature of a database query of a user.

The overall system will have at least three (3) levels of security: operator, supervisor, and manager. Moreover, access to the system is defined functionally, such as, for instance, view jobs, indicate job start and completion, number of mailpieces, generate reports, print, enter new job data, enter new device data, enter new process data, enter new operator data, update existing data, request re-optimization (scheduling), view historical data, and plan capacity. A system administrator has the ability to define which of the functions would be available to each of the security levels (operator, supervisor, and manager). One possible scenario is shown in the table below.

| SECURITY LEVEL | FUNCTION |
| --- | --- |
| Operator | View, Indicate Job Completion |
| Supervisor | Print, Generate Reports, Enter Mailpieces Processed, Enter Completed Times, Enter Comments |
| Manager | Enter New Jobs, Enter New Data, Update Existing Data |

Each level of security would have access to the system as defined by the system administrator and also to lesser security level functions. Thus, managers would have access to all three security levels while operators would only have access to their own level. Supervisors would have access to the supervisor and operator level but not the manager level of security. Other security layers may be added accordingly.

The system also provides for automatic data archival. All data is archived on the server as well as locally to the user's machine. Transactional data can be archived daily to the server and can be archived elsewhere. Users are able to define suitable periods for archiving (e.g., daily, weekly, monthly, semi-annually, annually), and users are also able to access the archived data. A user can look forward one year for larger capacity planning job scheduling purposes. Moreover, the system can copy and/or clear previous data. On recurring jobs, a user needs to be able to increase or decrease the expected input/output of that job. For example, if an operator ran jobs 1–5 each month last year and the forecast for the coming year indicates that jobs 1–5 will be increased by x%, then the operator will be able to automatically optimize the system to meet the increased needs.

Data is entered into the server in a variety of ways as previously discussed. Direct entry from each mail processing device in as near a real-time fashion as possible is most preferable. Handheld data entry devices (e.g. barcode scanners) are also utilized. Manual data entry is permitted when necessary. Data to be entered into the system includes data pertaining to processes (e.g., print, fold, insert, tray) and jobs (e.g., size, expected arrival date, actual arrival date, number of inserts, types of materials needed, and/or other suitable data.).

The types of mail processing devices and their respective feature sets will be configurable at the system level. Broad categories such as printers, inserters, sorters, roll systems, and/or other suitable categories can be defined. Within each category, the user will be able to identify specific devices present at a given site and be able to define the feature sets of the devices.

The system provides a real-time view of various job and scheduling status information viewable at a computer monitor. Thus, a supervisor or manager can instantaneously see if a job is falling behind its expected schedule. Reports can be generated based on a variety of sortable criteria including, but not limited to, operator, device, job, mailpieces processed, completed jobs, functional area, and/or other suitable criteria. Sorts can be layered as primary and secondary. Thus, a manager can, for instance, pull up a certain mail processing device operator in a primary sort and then call up all jobs assigned to that operator as a secondary sort. Many variations of accessing data and generating reports is available. Some examples include: jobs completed within a certain time period, printing generated reports, links to other software applications, combining data pertaining to a single job spanning multiple devices into a single report, and user defined report customization. The reports may be output to a printer, a data file to a floppy or hard disk, CD-ROM, facsimile, e-mail, or any other format well known in the art.

Job tracking is a software application that mines raw data from the server that has been gathered from various data entry devices and/or mail processing devices and stored within the server's database.

Using barcodes is one way to automate the tracking of jobs and/or accounts in a mail processing environment. Mainframe print manipulation software reads the print output jobs and statements and converts key data into barcodes in the output file. If jobs and accounts will be tracked, then both job barcodes and account barcodes will be required. A job barcode will be inserted on the header page of a print job and include information such as date, region, type and range. The job barcode will be read with a hand-held scanner at the machine or manual inserter stations and the data will be transferred to the server for tracking purposes. For account tracking, barcodes will be placed on each statement, for instance, and contain the account number, cycle, and application. As statements are being inserted, a machine reader will scan the account barcode and send the data to the server for tracking. This provides the ability to identify which jobs or accounts have been completed through the inserting stage.

In addition to automating the data collection from the inserters, daily processing and operational statistics for manual inserting and exceptions handling will also be collected and stored in the server. By providing customized templates for data entry, operators can log in with a unique code and scan or directly enter the information into the server. This will eliminate the requirement for working from paper reports or recording their results on paper forms. The benefit of collecting this information in the server is that it eliminates much of the manual effort and time spent on gathering daily statistics and preparing detail/summary reports. In addition, it improves data accuracy by using scanners in place of hand written logs.

For manual inserting, operators will scan the job barcode to indicate it is being worked on, scan the barcode for the accounts as they complete manual insertion and finally scan the job barcode again to indicate that the job is finished.

Automating the manual area also provides electronic data on operator workloads. Because operators will log in, as they do on the inserting machines, work statistics will be accumulated during the shift and be available for review when the shift ends. Once the data is captured, it can be summarized for input into other reports.

A primary objective of the server is to maintain a central repository of mail processing data that multiple people can access for data entry, review, update and generate custom reports. By collecting both mail processing device and manual data with input devices, essential data will be stored for immediate or later use. Data will be automatically available for statistical reporting such as volumes counts at detail and summary levels. Once device data is available, inputting barcode data with scanners in non-machine areas will provide a way to track jobs and accounts processed manually, such as highs and exceptions. With the processing data stored in the system, custom reports can be developed, saved and quickly regenerated when needed. This will improve the data accuracy and greatly reduce the time it takes to gather and create reports on a regular basis. Specialized reports can be generated for specific one time information needs.

The integrated solution described above will automate the collection of data from a variety of manual and machine processes as they occur so management and operators can use the data for decision making and report generation. Using barcodes in some processes helps maintain data integrity. Using computer data entry templates in other processes and machine generated statistics from the inserters, provides a timely electronic way to record and store data for later use. Combining these methods gives the user the ability to track jobs and accounts through their internal mail process and positions them to improve their own internal operations and external customer service.

Job tracking is viewed as an integrated, modular, scaleable software solution that provides mail processing personnel a way to track and analyze work as it moves through production. The preferred embodiment of the system is broken into the following major functional sub-systems: database design, configuration module, utility module, viewer module, and report designer module. Such major functional sub-systems are, however, not the only ones which could exist. Other functional areas may be developed according to specific client needs and readily incorporated within the scope of the present invention.

A data map is designed depicting the data relations and data flow necessary for all Interface Modules for a given mail processing environment. Once the data map has been developed development of the database scheme can occur.

The configuration module of the job tracker system allows supervisory personnel to tailor a job tracking application to fit a specific mail-processing environment. The configuration module will allow the user to design a mail process map that depicts the current mail process, edit the mail process map, create job-naming schema for the database. The configuration module further allows the user to graphically design a process map by defining objects representing individual process areas, referred to as stages, onto a process flow map. Once a stage is defined, the user can double click on that stage to edit its properties. Stage properties will contain the stage name and a description. Optional properties for the stage might include the type of the machines contained within a stage and their network address. The application will have a generic stage object to represent process areas. Once the user has completed the process map, it can be saved. When the map is saved, database tables are created from that map according to object properties. The user then has the ability to edit the map to reflect changes in the process.

A user can create job-naming schema within the configuration module by selecting the Job Name button. When the Job Name button is selected the job-naming screen will be displayed. The user can then input the number of levels for the job name and name each level. The user will also have the option to create a runtag from the concatenation of all the level names or have the job tracking program create a unique runtag.

A user can also enter the user manager by selecting the Manager user buttons. When the user button is depressed the manager user screen will be displayed, providing the current user logged on has system administration privileges. This screen will display a table containing all the users configured in the application and their respective security levels. The user can then add, edit, and delete users accordingly. Each of these functions will have a respective button that displays a pop-up window to perform the requested task.

The job viewer module provides the user with a visual front end to the database. The job viewer allows the user to display a snapshot, including status, of the job selected. The user will be able to drill down to details about that job via the naming convention established in the configuration module to view smaller segments or batches contained within that particular job. There is a graphical mode or text mode, user selectable, representation displayed for each detail level requested by the user. The data depicts what percentage of material has been completed at each stage.

The stage viewer module allows the user to view process statistics particular to a requested stage. Initially, a stage viewer for an inserter process is included. Additional stage viewers for other stages are developable according to customer needs.

The report viewer module has a menu from which the user will select pre-configured reports. When the user selects a report it will be displayed. The report viewer will also have a simple report creation interface where the user can build queries or type SQL statements to display customer reports on-line. An option to save custom reports can be selected by the operator.

The report viewer is used to intergrate reporting into the job tracking system. And should provide easy-to-use, object-oriented access to the entire database engine. Users can create ad hoc reports and queries themselves, or access existing reports and queries. If a user creates a report or query, they will have the option of adding the report to the existing list of reports for future use.

In general, per the preferred embodiment, the software will be designed around client-server architecture. The server operating system can be from Microsoft, Novell, or another brand. The database and web server software shall run on the server. Clients comprise worktstation capable of running web browsing software such as, for example, Microsoft Internet Explorer, Netscape Communicator, or the like. The client software shall be implemented with a combination of HTML, scripting and the JAVA programming language. The Report designer preferably uses Crystal Reports or Oracle Report Writer. Equivalents of the foregoing system components are readily implementable into the present invention without departing from the spirit or scope thereof.

Figure 3:
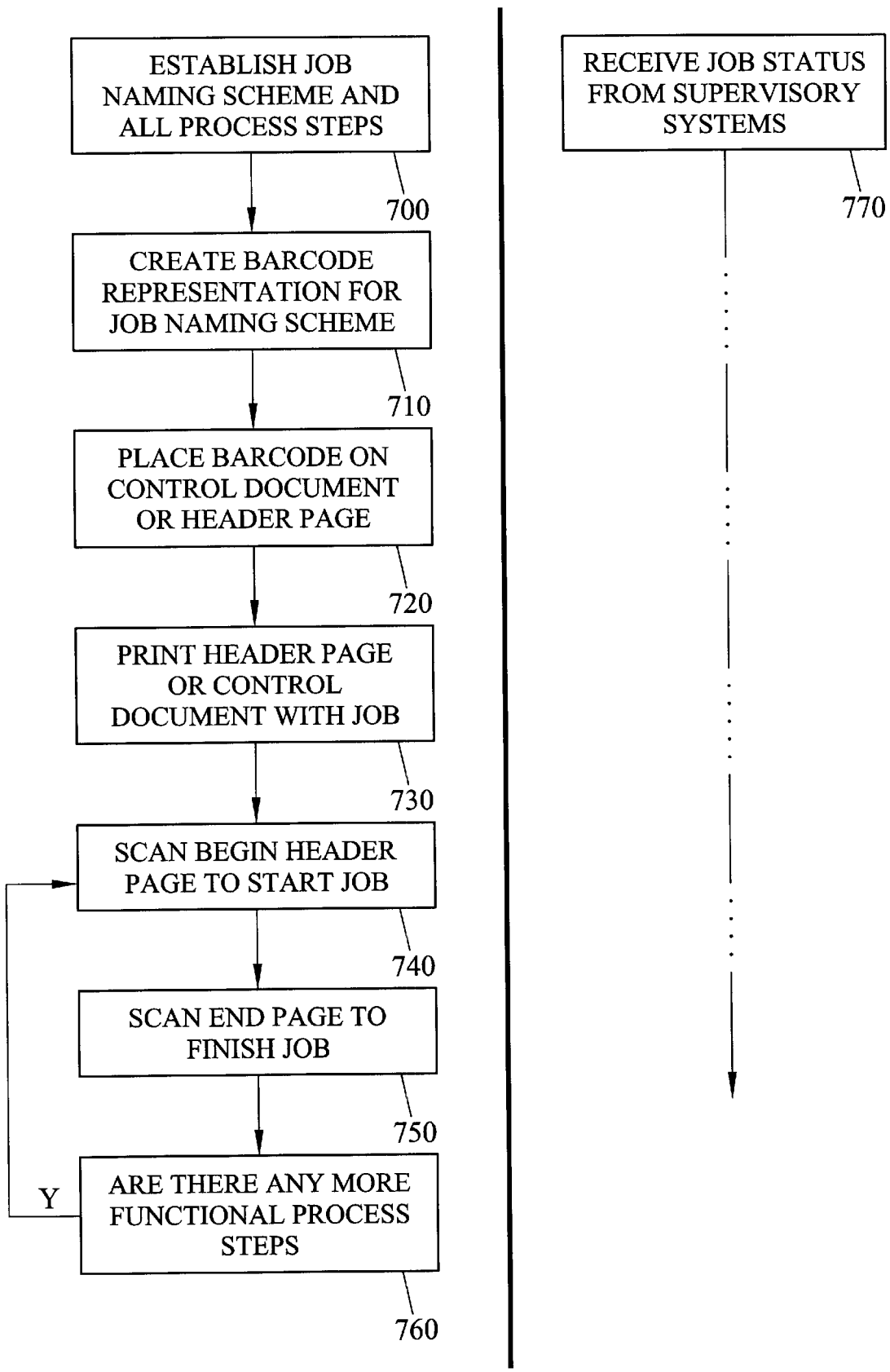
FIG. 3 illustrates the functions or processes in a typical mail processing job.

FIG. 3 illustrates the functions or processes involved in tracking a typical mail processing job. The job tracking application first establishes a job naming scheme 700 and establishes all the process steps that the job will involve. Next, a barcode representation for the job naming scheme is created 710. A barcode is then placed on the control document, or header page 720. The header page or control document is printed 730 with the job. A mail processing job process is then started 740 by scanning the "begin header page". The mail processing job process is terminated 750 by scanning the "end page". A check 760 is made to determine if there are any remaining processes for the mail processing job. If so, the next job process is started 740 by scanning the "begin header page". Meanwhile, job status is continually able to be received 770 during execution of the mail processing job from supervisory systems.

The job tracking system assists an operator in tracking the status of a job and batches within that job. Under the preferred embodiment, an operator will view the job tracking system through a graphical user interface (GUI) in the form of a Java applet running in a web browser. The applet has the ability to allow the operator to make multiple selections based on batch, operator, etc. and run a query. The applet connect to the server/database and retrieves and displays the requested information. For purposes of illustration, the job tracking applet is shown running in a Netscape web browser, however, this applet will also run in Microsoft's Internet Explorer and Sun's HotJava browser, or any other java enabled browser application.

Figure 4:
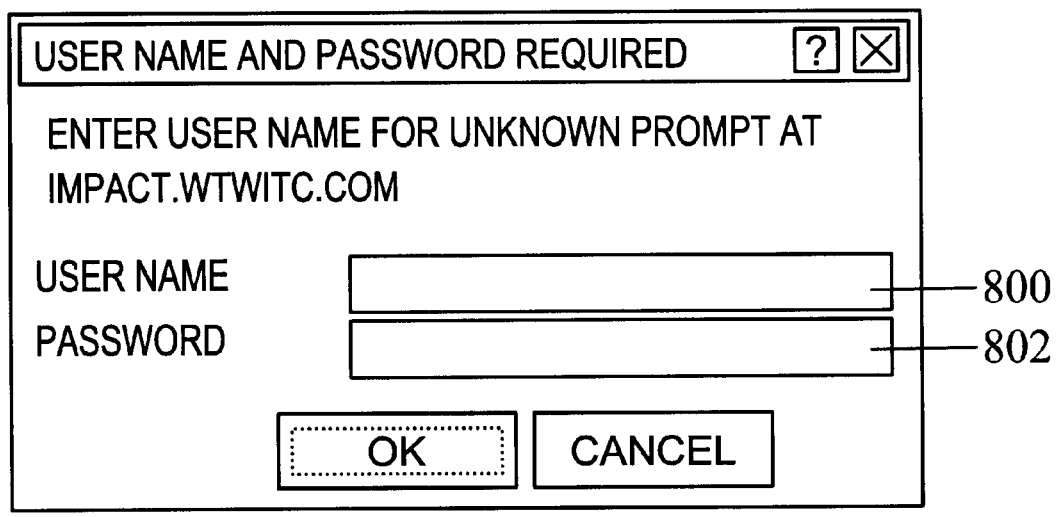
FIG. 4 illustrates a typical logon screen to gain access to the job tracking system of the present invention.

Prior to running the job tracking applet, the operator must first logon to the server. FIG. 4 illustrates a typical logon screen which asks for a "user name" 800 and a "password" 802. Upon verification, the user is granted access to the job tracking system. This provides a measure of security in that not just anyone can view the job tracking information.

Figure 5:
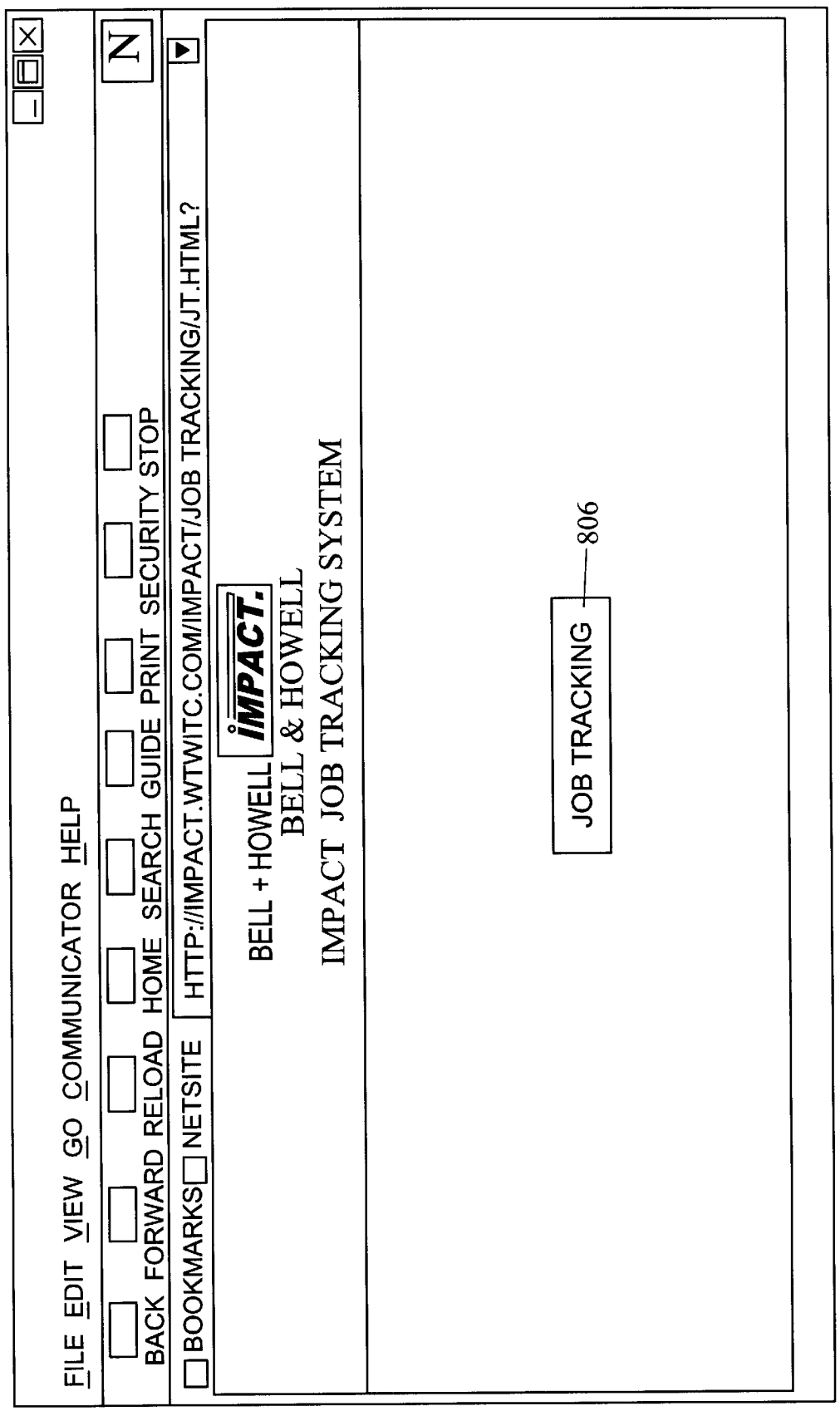
FIG. 5 illustrates the job tracking splash screen for the job tracking system of the present invention.

Following the logon pop-up screen, the operator sees the job tracking splash screen of FIG. 5. This is an informational screen stating this is the Bell & Howell IMPACT™ job tracking system. It also contains a button 806 to launch the job tracking applet.

Figure 6:
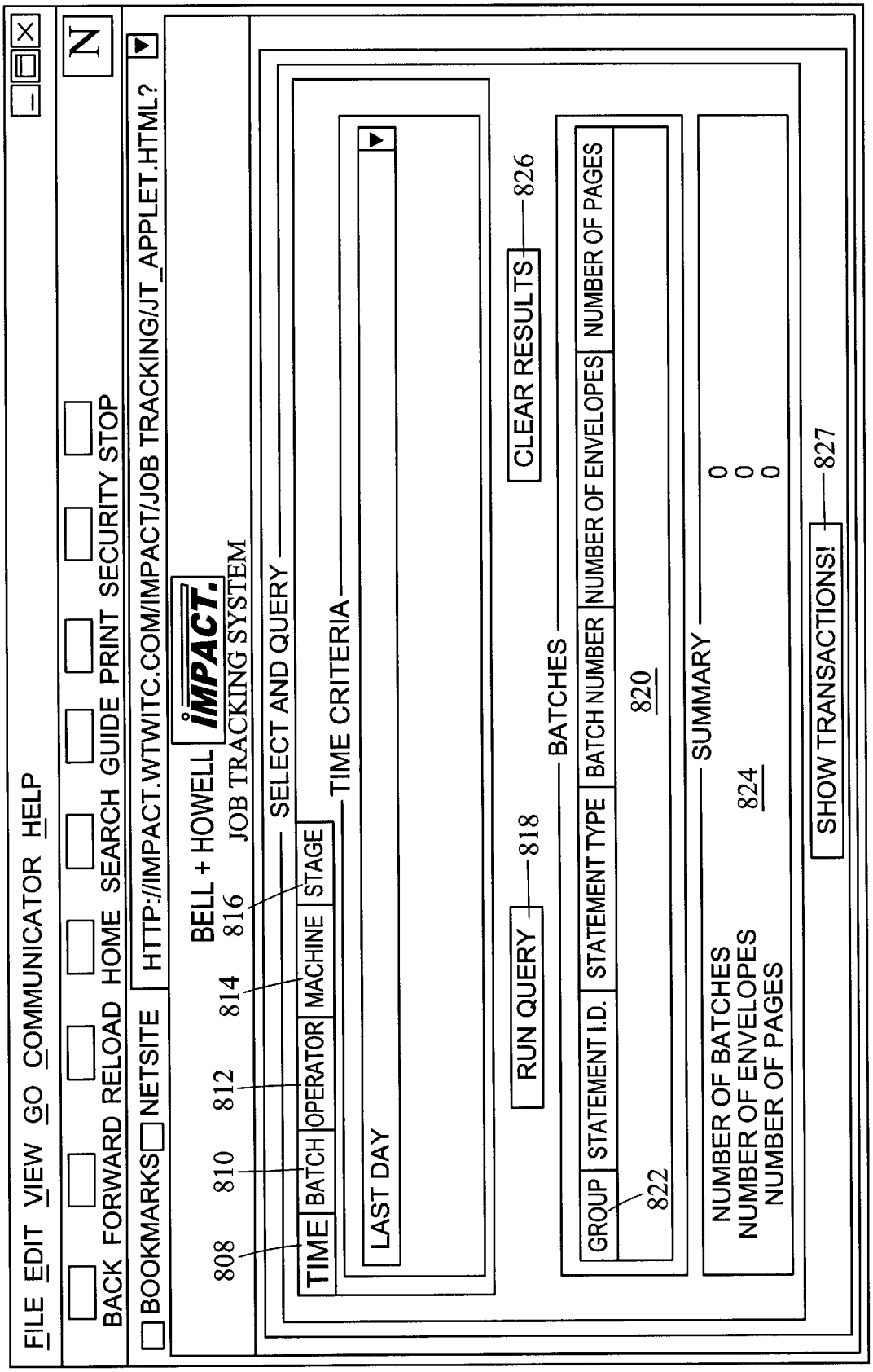
FIG. 6 illustrates a job tracking applet which provides options for the operator to select specific criteria through a set of five tabbed panels.

Referring now to FIG. 6, the job tracking applet provides options for the operator to select specific criteria through a set of five tabbed panels: Time 808, Batch 810, Operator 812, Machine 814, and stage 816. Each tab contains options that serve to build an SQL query to the database. Once the selections are completed, the operator then clicks the "Run Querly" button 818. The query results are displayed in the "BATCHES" panel 820 located below the tab panels. The results show all the batches associated with the selection criteria given in the tabbed panels and is sorted by the Group 822 of the Batch ID. The "SUMMARY" panel 824, located directly below the batch information panel, displays the number of batches, number of envelopes, and the number of pages. Should the operator want to run a new query, a "Clear Results" button 826 is provided to clear the "BATCHES" and "SUMMARY" panels. This resets the panel, thereby clearing the way for a new set of results to be displayed after a new query has been run. At the bottom of the screen shot there is a "Show Transactions!" button 827. This button will display the transactions associated with a particular batch. To view the transactions of a batch, click on a row to highlight it and then click on the 'Show Transactions!' button 827.

Figure 7:
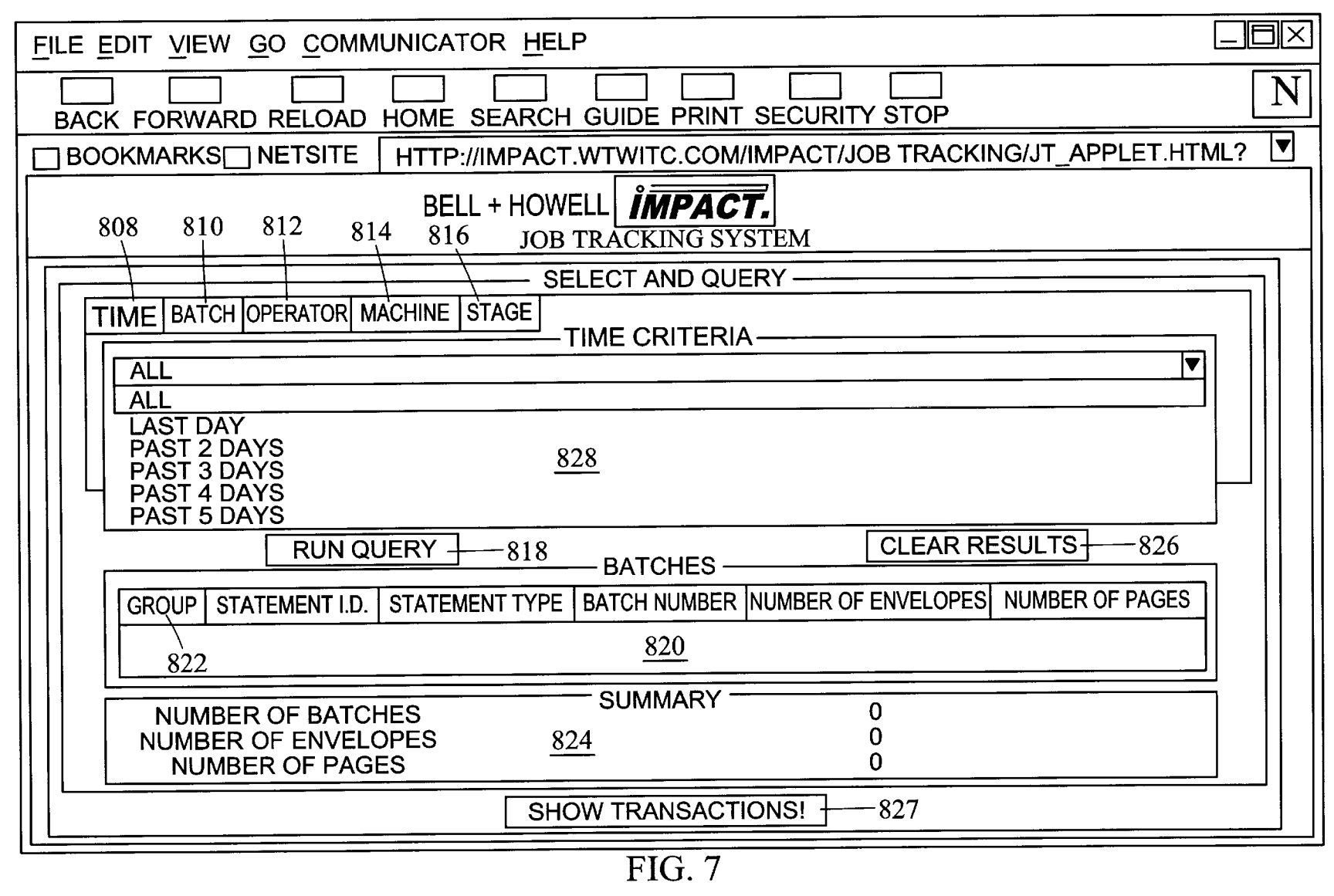
Figure 8:
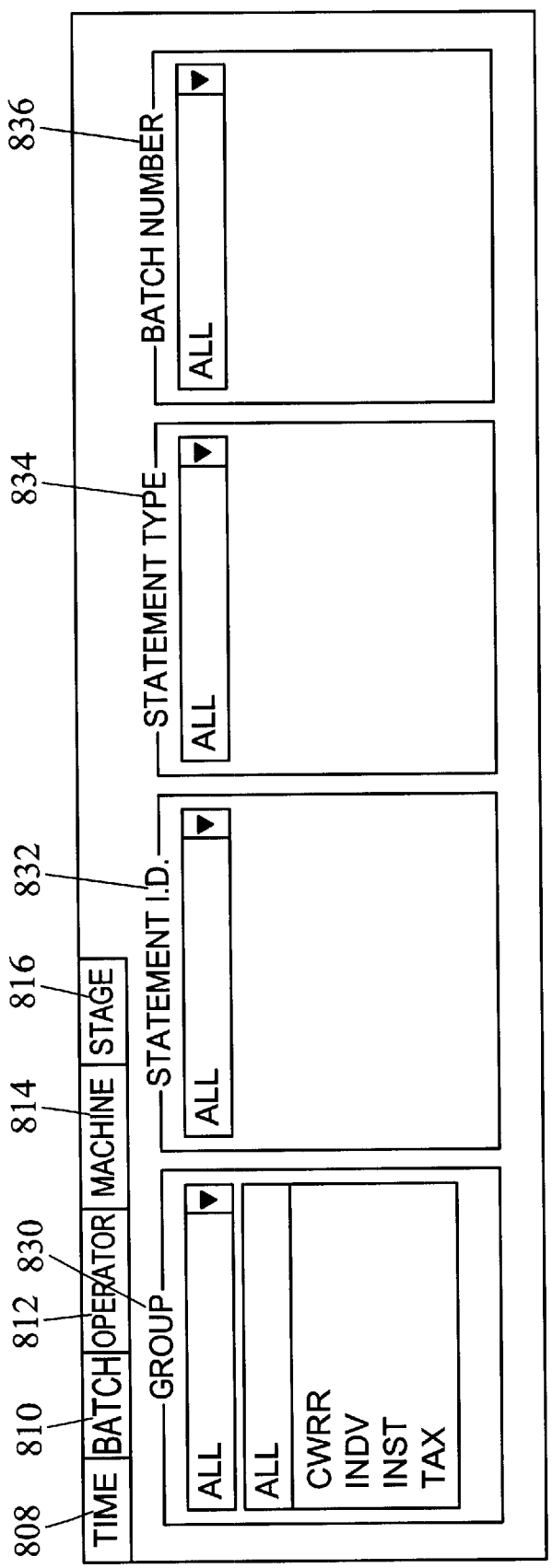
FIG. 8 illustrates the batch panel within the job tracking applet.
Figure 11:
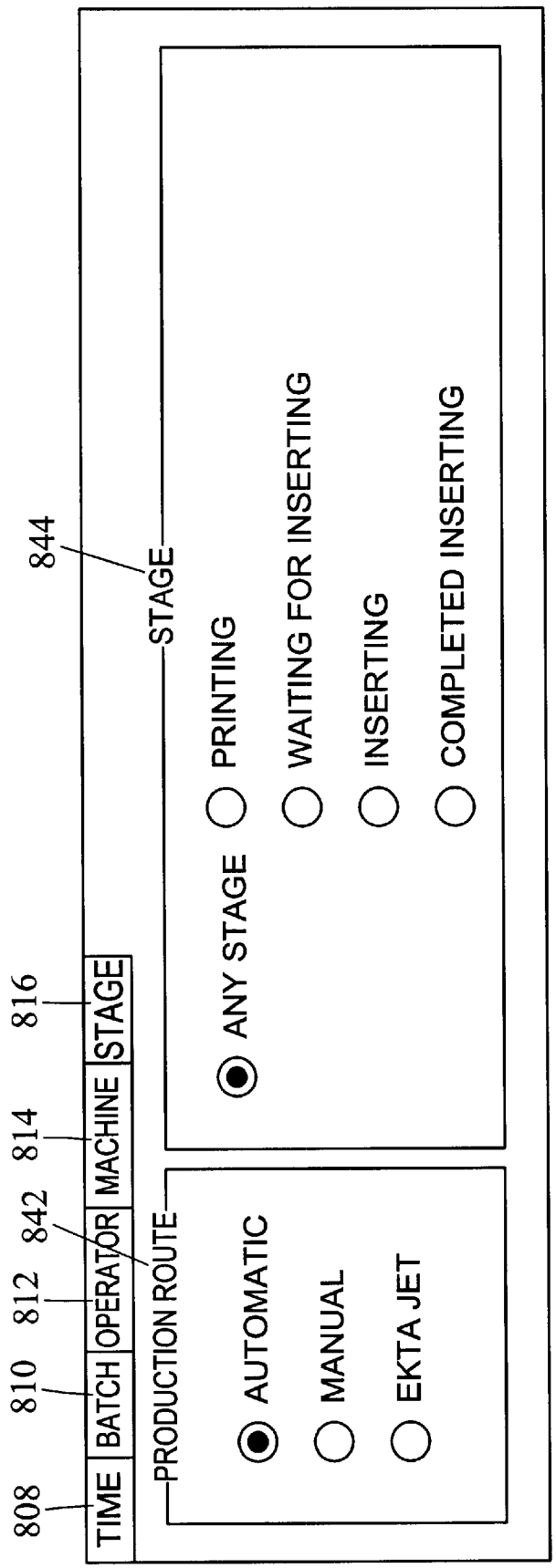
FIG. 11 illustrates the stage panel within the job tracking applet.

The time tab panel, illustrated in FIG. 7, includes options for "ALL" to the "Last 5 Days" in a choice pull-down box 828. The batch tab panel, illustrated in FIG. 8, contains four choice boxes; Group 830, Statement ID 832, Statement Type 834, and Batch Number 836. The operator will work from left to right making the desired selections. If the operator needs to go back to a previous choice box, the selections of the following choice boxes will change. The operator tab panel, illustrated in FIG. 9, contains a choice box 838 of all possible operators. The operator may also select 'ALL' to review the work done by all operators. The machine tab panel, illustrated in FIG. 10, contains a choice box 840 of all the machines for which information can be retrieved. The stage tab panel, illustrated in FIG. 11, contains two sub panels; a production route panel 842 and a stage panel 844. The production route panel contains three radio buttons for the types of production routes that exist for a given customer. The stage panel contains five radio buttons for this particular customer; Any Stage, Printing, Waiting for Inserting, Inserting, and Completed Inserting.

FIG. 12 illustrates the batches panel 820 that has been filled with the results of a query. Note the summary panel 824 has the overall totals for the query.

FIG. 13 illustrates transactions for a particular batch. Transactions include "Startinsert" 846 and "FinishInsert" 848, since only inserters are tracked in the present example. At the bottom of this screen, the operator can click the "Return to Batch Query" button 850 and return to the screen of FIG. 7.

Appropriate computer program code in combination with hardware implements many of the elements of the present invention. This computer code is often stored on storage media. This media can be a diskette, hard disk, CD-ROM, or tape. The media can also be a memory storage device or collection of memory storage devices such as read-only memory (ROM) or random access memory (RAM). Additionally, the computer program code can be transferred to the appropriate hardware over some type of data network.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims.

In the claims, any means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed:

1. A method for tracking job data for document processing, the method comprising:
   (a) gathering mailpiece processing job data from a plurality of mailpiece processing devices pertaining to status of a mailpiece or mailpiece processing job and storing the mailpiece processing job data in a server database, wherein the gathering and storing occur in real-time during mailpiece processing by the mailpiece processing devices;
   (b) providing real-time access to the mailpiece processing data stored in the server database; and
   (c) providing a real-time view of the data stored in the server database.

2. The method of claim 1 wherein the mailpiece processing job data is gathered directly from the mailpiece processing devices.

3. The method of claim 1 wherein the mailpiece processing job data is gathered from bar code scanning devices associated with the mailpiece processing devices.

4. The method of claim 1 wherein the database is physically located remote from the mailpiece processing devices and receives the gathered job data from the mailpiece processing devices via a computer network link.

5. A method for mining data from a server database possessing data pertaining to at least one mailpiece processing job or mailpiece, the data being gathered from at least one mailpiece processing device and stored in the server database in real-time during execution of a mailpiece processing job, the method comprising:
   (a) providing real-time access to the data stored in the server database;
   (b) providing a real-time view of the data stored in the service database;
   (c) selectively retrieving, in real-time, data relating to execution of a mailpiece processing job from the server database, and
   (d) organizing the retrieved data into a desired format.

6. The method of claim 5 further comprising outputting the organized data.

7. The method of claim 5 wherein the access to the server database is achievable from a remote location through a computer network link.

8. The method of claim 7 wherein the data is selectively retrieved and transferred to a local processing device for organization into a desired format.

9. The method of claim 5 wherein a definable subset of job or mailpiece status data is selectable based on pre-defined job naming characteristics.

10. A method for mining data from a server database possessing data pertaining to at least one mailpiece processing job or mailpiece, the data being gathered from a plurality of mailpiece processing devices and stored in the server database in real-time during execution of a mailpiece processing job, the method comprising:
    (a) providing real-time access to the server database, wherein the access is determinable based on pre-definable security levels;
    (b) providing a real-time view of the data stored in the server database;
    (c) selectively retrieving, in real-time, data relating to execution of a mailpiece processing job from the server database; and
    (d) organizing the retrieved data into a desired format.

11. A system for tracking mailpiece or job status data within an entire mail processing facility or system, the system comprising:
    (a) a plurality mailpiece processing devices for processing at least one mailpiece or mailpiece processing job;
    (b) a server database operatively connected to the mailpiece processing devices for receiving and storing status data pertaining to a mailpiece or mailpiece processing job in real-time as the mailpiece or mailpiece processing job is processed by the mailpiece processing device; and
    (c) a processing device operatively associated with the server database for providing a real-time view of the data stored in the server database.

12. The system of claim 11 wherein the data is received directly from the mailpiece processing devices.

13. The system of claim 11 wherein the data is received from bar code scanning devices associated with the mailpiece processing devices.

14. The system of claim 11 wherein the server database is physically located remote from the mailpiece processing devices and receives the data from the mailpiece processing devices via a computer network link.

15. A system for mining data from a server database possessing data pertaining to at least one mailpiece processing job or mailpiece, the data being gathered from a plurality of mailpiece processing devices and stored in the server database in real-time during execution of a mailpiece processing job, the system comprising:
    (a) a server database possessing data pertaining to at least one mailpiece processing job or mailpiece, the data being gathered from a plurality of mailpiece processing devices and stored in the database in real-time; and
    (b) a processing device operatively connected to the database for providing a real-time view of the data stored in the server database and selectively retrieving, in real-time, the data pertaining to at least one mailpiece processing job or mailpiece.

16. The system of claim 15 wherein access to the server database by processing device is achievable from a remote location through a computer network link.

17. The system of claim 15 wherein the retrieved data is organized into a desired format.

18. The system of claim 15 wherein a definable subset of job or mailpiece status data is selectable based on pre-defined job naming characteristics.

19. A system for mining data from a server database for processing data pertaining to at least one mailpiece processing job or mailpiece, the data being gathered from a plurality of mailpiece processing devices and stored in the server database in real-time during execution of a mailpiece processing job, the system comprising:
    (a) a server database for receiving and storing, in real-time, data pertaining to at least one mailpiece processing job or mailpiece by a plurality of mailpiece processing devices, wherein access to the server database is determinable based on pre-definable security levels; and (b) a processing device operatively connected to the server database for providing a real-time view of the data stored in the database and for selectively retrieving, in real-time, the data pertaining to at least one mailpiece processing job or mailpiece.

20. A method for tracking mailpiece or job status data within an entire mailpiece processing facility or system and mining data from a server database possessing mailpiece or mailpiece processing job status data pertaining to at least one mailpiece processing job or mailpiece, the mailpiece or mailpiece processing job status data being gathered from a plurality of mailpiece processing devices during execution of a mailpiece processing job, the method comprising:

(a) gathering data pertaining to the status of a mailpiece or mailpiece processing job and storing the data in a server database in real-time as the mailpiece or mailpiece processing job is processed by the mailpiece processing devices in the mailpiece processing system;

(b) providing real-time access to the data stored in the server database;

(c) providing a real-time view of the data stored in the server database;

(d) selectively retrieving data from the database; and (e) organizing the retrieved data into a desired format.

21. The method of claim 20 wherein the data is gathered directly from the mailpiece processing devices.

22. The method of claim 20 wherein the data is gathered from a bar code scanning device associated with the mailpiece processing devices.

23. The method of claim 20 wherein the server database is physically located remote from the mailpiece processing device and receives the gathered data from the mailpiece processing devices via a computer network link.

24. The method of claim 20 wherein the access to the server database is achievable from a remote location through a computer network link.

25. The method of claim 24 wherein the data is selectively retrieved and transferred to a local processing device for organization into a desired format.

26. The method of claim 20 wherein a definable subset of job or mailpiece status data is selectable based on pre-defined job naming characteristics.

27. A method for tracking mailpiece or job status data within an entire mailpiece processing facility or system and mining data from a server database possessing mailpiece or mailpiece processing job status data pertaining to at least one mailpiece processing job or mailpiece, the mailpiece or mailpiece processing job status data being gathered from a plurality mailpiece processing devices and stored in the server database in real-time during execution of a mailpiece processing job, the method comprising:

(a) gathering data pertaining to the status of a mailpiece or mailpiece processing job and storing the data in a server database in real-time as the mailpiece or mailpiece processing job is processed by a plurality of mailpiece processing devices in the mailpiece processing system;

(b) providing real-time access to the data in the server database, wherein the access to the database is determinable based on pre-definable security levels;

(c) providing a real-time view of the data stored in the server database;

(d) selectively retrieving data from the database; and (e) organizing the retrieved data into a desired format.

28. A system for tracking mailpiece or mailpiece processing job status within an entire mailpiece processing facility or system and mining data from a server database possessing mailpiece or job status data pertaining to at least one mailpiece processing job or mailpiece, the mailpiece or job status data being gathered from a plurality of mailpiece processing devices and stored in the server database in real-time during execution of a mailpiece processing job, the system comprising:

(a) a plurality mailpiece processing devices for processing at least one mailpiece or mailpiece processing job;

(b) a server database operatively connected to the mailpiece processing devices for receiving status data pertaining to a mailpiece or mailpiece processing job in real-time as the mailpiece or mailpiece processing job is processed by the mailpiece processing devices; and (c) a processing device operatively connected to the server database for providing a real-time view of the data stored in the server database and selectively retrieving, in real-time, data pertaining to at least one mailpiece processing job.

29. The system of claim 28 wherein the mailpiece or mailpiece processing job status data is received directly from the mailpiece processing devices.

30. The system of claim 28 wherein the mailpiece or mailpiece processing job status data is received from a bar code scanning device associated with the mailpiece processing devices.

31. The system of claim 28 wherein the server database is physically located remote from the mailpiece processing devices and receives the data from the mailpiece processing device via a computer network link.

32. The system of claim 28 wherein access to the server database by the mailpiece processing devices is achievable from a remote location through a computer network link.

33. The system of claim 28 wherein the retrieved data is organized into a desired format.

34. The system of claim 28 wherein a definable subset of job or mailpiece status data is selectable based on pre-defined job naming characteristics.

35. A system for tracking mailpiece or mailpiece processing job status within an entire mailpiece processing facility or system and mining data from a server database possessing mailpiece or job status data pertaining to at least one mailpiece processing job or mailpiece, the mailpiece or job status data being gathered from a plurality of mailpiece processing devices and stored in the server database in real-time during execution of a mailpiece processing job, the system comprising:

(a) a plurality of mailpiece processing devices for processing at least one mailpiece or mailpiece processing job;

(b) a server database operatively connected to the mailpiece processing devices for receiving and storing status data pertaining to a mailpiece or mailpiece processing job in real-time as the mailpiece or mailpiece processing job is processed by the mailpiece processing devices wherein access to the server database is determinable based on pre-definable security levels; and (c) a processing device operatively connected to the server database for providing a real-time view of the data stored in the server database and selectively retrieving, in real-time, data pertaining to at least one mailpiece processing job.

36. A computer program product for tracking mailpiece or mailpiece processing job status within an entire mailpiece processing facility or system and mining data from a server database possessing mailpiece or mailpiece processing job status data pertaining to at least one mailpiece processing job or mailpiece, the mailpiece or job status data being gathered from a plurality of mailpiece processing devices and stored in the server database in real-time during execution of a mailpiece processing job, the computer program product having a medium with a computer program embodied thereon, the computer program product comprising:

(a) computer program code for gathering data pertaining to the status of a mailpiece or mailpiece processing job and storing the data in a server database in real-time as the mailpiece or mailpiece processing job is processed by a plurality of mailpiece processing devices in the mailpiece progressing system;

(b) computer program code for providing real-time access to the data in the server database;

(c) computer program code for providing a real-time view of the data stored in the server database;

(d) computer program code for selectively retrieving data from the server database; and (e) computer program code for organizing the retrieved data into a desired format.

37. The computer program product of claim 36 further comprising computer program code for outputting the organized data.

38. A method for tracking job data for document processing, the method comprising:

(a) gathering mailpiece processing job data from a plurality of mailpiece processing devices pertaining to status of a mailpiece or mailpiece processing job and storing the mailpiece proceesing data in a server database in real-time during mailpiece processing by the mailpiece processing devices, wherein gathering job data from the mailpiece processing devices includes gathering job data from a mailpiece inserter;

(b) providing real-time access to the job data stored in the server database; and (c) providing a real-time view of the job data stored in the server database.

39. A method for tracking job data for document processing, the method comprising:

(a) gathering mailpiece processing job data from a plurality of mailpiece processing devices pertaining to status of a mailpiece or mailpiece processing job and storing the job data in a server database in real-time during mailpiece processing by the mailpiece processing devices, wherein gathering job data from the mailpiece processing devices includes gathering job data from a mailpiece sorter;

(b) providing real-time access to the job data stored in the database; and (c) providing a real-time view of the data stored in the server database.

40. A method for mining data from a server database for processing data pertaining to at least one mailpiece processing job or mailpiece, the data being gathered from a plurality of mailpiece processing devices and stored the job data in the server database in real-time during execution of a mailpiece processing job, the method comprising:

(a) providing real-time access to the server database;

(b) providing a real-time view of the data stored in the server database;

(c) selectively retrieving data relating to execution of a mailpiece processing job from the server database; and (d) organizing the retrieved data into a desired format, wherein selectively retrieving data relating to execution of a mailpiece processing job comprises selectively retrieving data relating to mailpiece inserting.

41. A method for mining data from a server database for possessing data pertaining to at least one mailpiece processing job or mailpiece, the data being gathered from a plurality of mailpiece processing devices and stored in the server database in real-time during execution of a mailpiece processing job, the method comprising:

(a) providing real-time access to the server database;

(b) providing a real-time view of the data stored in the server database;

(c) selectively retrieving data relating to execution of a mailpiece processing job from the server database; and (d) organizing the retrieved data into a desired format, wherein selectively retrieving data relating to execution of a mailpiece processing job comprises selectively retrieving data relating to mailpiece sorting.

42. A system for tracking mailpiece or job status data within an entire mail processing facility or system, the system comprising:

(a) a plurality of mailpiece processing devices for processing at least one mail or mailpiece processing job;

(b) a server database operatively connected to the mailpiece processing devices for receiving and storing status data pertaining to a mailpiece or mailpiece processing job in real-time as the mailpiece or mailpiece processing job is processed by the mailpiece processing devices, wherein the mailpiece processing devices include a mailpiece inserter; and (c) a processing device coupled to the server database for providing a real-time view of the status data stored in the server database.

43. A system for tracking mailpiece or job status data within an entire mail processing facility or system, the system comprising:

(a) a plurality of mailpiece processing devices for processing at least one mail or mailpiece processing job; and (b) a server database operatively connected to the mailpiece processing devices for receiving and storing status data pertaining to a mailpiece or mailpiece processing job in real-time as the mailpiece or mailpiece processing job is processed by the mailpiece processing devices, wherein the mailpiece processing devices include a mailpiece sorter; and (c) a processing device coupled to the server database for providing a real-time view of the status data stored in the server database.

44. A system for mining data from a database possessing data pertaining to at least one mailpiece processing job or mailpiece, the data being gathered from a plurality of mailpiece processing devices and stored in the database in real-time during execution of a mailpiece processing job, the system comprising:

(a) a server database for gathering and storing data pertaining to at least one mailpiece processing job or mailpiece by a plurality of mailpiece processing devices, the data being gathered and stored in real-time during processing of the mailpiece processing job; and (b) a processing device operatively connected to the server database for providing a real-time view of the data stored in the server database and for selectively retrieving, in real-time, data pertaining to at least one mailpiece processing job or mailpiece, wherein the processing device is adapted to retrieve data pertaining to a mailpiece inserting job from the server database.

45. A system for mining data from a server database for processing data pertaining to at least one mailpiece processing job or mailpiece, the data being gathered from a plurality of mailpiece processing devices and stored in the server database in real-time during execution of a mailpiece processing job, the system comprising:

(a) a server database for gathering and storing data pertaining to at least one mailpiece processing job or mailpiece by a plurality of mailpiece processing devices, the data being gathered and stored in real-time during processing of the mailpiece processing job; and (b) a processing device operatively connected to the server database for providing a real-time view of the data stored in the server database and for selectively retrieving, in real-time, data pertaining to at least one mailpiece processing job or mailpiece, wherein the processing device is adapted to retrieve data pertaining to a mailpiece sorting job from the database.

46. A method for tracking mailpiece or job status data within an entire mailpiece processing facility or system and mining data from a server database possessing mailpiece or mailpiece processing job status data pertaining to at least one mailpiece processing job or mailpiece, the mailpiece or mailpiece processing job status data being gathered from a plurality of mailpiece processing devices and stored in the server database in real-time during execution of a mailpiece processing job, the method comprising:

(a) gathering data pertaining to the status of a mailpiece or mailpiece processing job and storing the data in the server database in real-time as the mailpiece or mailpiece processing job is processed by the mailpiece processing devices in the mailpiece processing system;

(b) providing real-time access to the server database;

(c) providing a real-time view of the data stored in the server database;

(d) selectively retrieving data from the server database; and (e) organizing the retrieved data into a desired format, wherein gathering data pertaining to the status of a mailpiece or job as it is processed by the mailpiece processing devices includes gathering data from a mailpiece inserter.

47. A method for tracking mailpiece or job status data within an entire mailpiece processing facility or system and mining data from a server database possessing mailpiece or mailpiece processing job status data pertaining to at least one mailpiece processing job or mailpiece, the mailpiece or mailpiece processing job status data being gathered from a plurality of mailpiece processing devices and stored in the server database in real-time during execution of a mailpiece processing job, the method comprising:

(a) gathering data pertaining to the status of a mailpiece or mailpiece processing job and storing the data in a server database in real-time as the mailpiece or mailpiece processing job is processed by a plurality of mailpiece processing devices in the mailpiece processing system;

(b) providing real-time access to the server database;

(c) providing a real-time view of the data stored in the server database:

(d) selectively retrieving data from the server database; and (e) organizing the retrieved data into a desired format, wherein gathering data pertaining to the status of a mailpiece or job as it is processed by the mailpiece processing devices includes gathering data from a mailpiece sorter.

48. A system for tracking mailpiece or mailpiece processing job status within an entire mailpiece processing facility or system and mining data from a server database possessing mailpiece or job status data pertaining to at least one mailpiece processing job or mailpiece, the mailpiece or job status data being gathered from a plurality of mailpiece processing devices and stored in the server database in real-time during execution of a mailpiece processing job, the system comprising:

(a) a plurality of mailpiece processing devices for processing at least one mailpiece or mailpiece processing job;

(b) a server database operatively connected to the mailpiece processing devices for receiving and storing status data pertaining to a mailpiece or mailpiece processing job in real-time as the mailpiece or mailpiece processing job is processed by the mailpiece processing devices; and (c) a processing device operatively connected to the server database for providing a real-time view of the status data stored in the server database and selectively retrieving, in real time, data pertaining to at least one mailpiece processing job, wherein the mailpiece processing devices include a mailpiece inserter.

49. A system for tracking mailpiece or mailpiece processing job status within an entire mailpiece processing facility or system and mining data from a server database possessing mailpiece or job status data pertaining to at least one mailpiece processing job or mailpiece, the mailpiece or job status data gathered from a plurality of mailpiece processing devices and stored in the server database in real-time during execution of a mailpiece processing job, the system comprising:

(a) a plurality of mailpiece processing devices for processing at least one mailpiece or mailpiece processing job;

(b) a server database operatively connected to the mailpiece processing devices for receiving and storing status data pertaining to a mailpiece or mailpiece processing job in real-time as the mailpiece or mailpiece processing job is processed by the mailpiece processing devices; and (c) a processing device operatively connected to the server database for providing a real-time view of the status data stored in the server database and selectively retrieving, in real-time, data pertaining to at least one mailpiece processing job, wherein the mailpiece processing devices include a mailpiece sorter.

50. A computer program product for tracking mailpiece or mailpiece processing job status within an entire mailpiece processing facility or system and mining data from a server database possessing mailpiece or mailpiece processing job status data pertaining to at least one mailpiece processing job or mailpiece, the mailpiece or job status data being gathered from a plurality of mailpiece processing devices and stored in the server database in real-time during execution of a mailpiece processing job, the computer program product having a medium with a computer program embodied thereon, the computer program product comprising:

(a) computer program code for gathering data pertaining to the status of a mailpiece Qr mailpiece processing job and storing the data in a server database in real-time as the mailpiece or mailpiece processing job is processed by a plurality of mailpiece processing devices in the mailpiece processing system;

(b) computer program code for providing real-time access to the server database;

(c) computer program code for providing a real-time view of the data stored in the server database;

(d) computer program code for selectively retrieving data from the server database; and (e) computer program code for organizing the retrieved data into a desired format, wherein the computer program code for gathering data pertaining to the status of a mailpiece or mailpiece processing job as it is processed by the mailpiece processing devices in the mailpiece processing stream includes computer program code for gathering data from a mailpiece inserter.

51. A computer program product for tracking mailpiece or mailpiece processing job status within an entire mailpiece processing facility or system and mining data from a server database possessing mailpiece or mailpiece processing job status data pertaining to at least one mailpiece processing job or mailpiece, the mailpiece or job status data being gathered from a plurality of mailpiece processing devices and stored in the server database in real-time during execution of a mailpiece processing job, the computer program product having a medium with a computer program embodied thereon, the computer program product comprising:

(a) computer program code for gathering data pertaining to the status of a mailpiece or mailpiece processing job and storing the data in a server database in real-time as the mailpiece or mailpiece processing job is processed by a plurality of mailpiece processing devices in the mailpiece processing system;

(b) computer program code for providing real-time access to the server database;

(c) computer program code for providing a real-time view of the data stored in the server database;

(d) computer program code for selectively retrieving data from the server database; and (e) computer program code for organizing the retrieved data into a desired format, wherein the computer program code for gathering data pertaining to the status of a mailpiece or mailpiece processing job as it is processed by the mailpiece processing devices in the mailpiece processing system includes computer program code for gathering data from a mailpiece sorter.

\* \* \* \* \*